(12) United States Patent
Ogawa et al.

(10) Patent No.: US 11,760,070 B2
(45) Date of Patent: *Sep. 19, 2023

(54) ELECTROCONDUCTIVE LAYERED PRODUCT, TOUCH PANEL, AND PROCESS FOR PRODUCING ELECTROCONDUCTIVE LAYERED PRODUCT

(71) Applicant: DAI NIPPON PRINTING CO., LTD., Tokyo (JP)

(72) Inventors: Yoshimasa Ogawa, Tokyo (JP); Yukimitsu Iwata, Tokyo (JP); Yuji Shimizu, Tokyo (JP); Eiji Ooishi, Tokyo (JP); Shoichiro Ogumi, Tokyo (JP); Norinaga Nakamura, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/647,111

(22) Filed: Jan. 5, 2022

(65) Prior Publication Data

US 2022/0126551 A1 Apr. 28, 2022

Related U.S. Application Data

(63) Continuation of application No. 15/564,665, filed as application No. PCT/JP2016/061148 on Apr. 5, 2016, now Pat. No. 11,247,444.

(30) Foreign Application Priority Data

| Apr. 6, 2015 | (JP) | 2015-077752 |
| Apr. 6, 2015 | (JP) | 2015-077753 |
| Sep. 30, 2015 | (JP) | 2015-194903 |
| Sep. 30, 2015 | (JP) | 2015-194904 |

(51) Int. Cl.
*B32B 27/20* (2006.01)
*B32B 37/00* (2006.01)
*B32B 38/00* (2006.01)
*G06F 3/041* (2006.01)

(52) U.S. Cl.
CPC ............ *B32B 27/20* (2013.01); *B32B 37/025* (2013.01); *B32B 38/0008* (2013.01); *B32B 38/0036* (2013.01); *G06F 3/041* (2013.01); *B32B 2038/0076* (2013.01); *B32B 2310/0831* (2013.01); *B32B 2310/0887* (2013.01); *B32B 2457/208* (2013.01); *G06F 2203/04103* (2013.01)

(58) Field of Classification Search
CPC ... B32B 27/20; B32B 37/025; B32B 38/0036; B32B 38/0008; G06F 3/041
USPC .......................................................... 428/323
See application file for complete search history.

(56) References Cited

U.S. PATENT DOCUMENTS

| 8,049,333 B2 | 11/2011 | Alden et al. |
| 2007/0065651 A1 | 3/2007 | Glatkowski et al. |
| 2010/0252184 A1 | 10/2010 | Morimoto et al. |
| 2011/0018424 A1 | 1/2011 | Takada |
| 2011/0216029 A1 | 9/2011 | Jin et al. |
| 2012/0295071 A1 | 11/2012 | Sato et al. |
| 2014/0034360 A1 | 2/2014 | Tanaka et al. |
| 2014/0048131 A1 | 2/2014 | Tanaka et al. |
| 2014/0232950 A1 | 8/2014 | Park et al. |
| 2014/0338960 A1 | 11/2014 | Inoue et al. |
| 2015/0013764 A1 | 1/2015 | Matsumura et al. |
| 2016/0081184 A1 | 3/2016 | Katagiri et al. |
| 2016/0346839 A1 | 12/2016 | Ishii et al. |

FOREIGN PATENT DOCUMENTS

| CN | 103597550 | 2/2014 |
| JP | 2006-035771 | 2/2006 |
| JP | 2006-519712 | 8/2006 |
| JP | 2009-505358 | 2/2009 |
| JP | 2009-252493 | 10/2009 |
| JP | 2010-084173 | 4/2010 |
| JP | 2011-090878 | 5/2011 |
| JP | 4722412 B2 | 7/2011 |
| JP | 2013-077435 | 4/2013 |
| JP | 2013-225460 | 10/2013 |
| JP | 5430792 B | 3/2014 |
| JP | 2014-188828 | 10/2014 |
| WO | 2007/022226 | 2/2007 |
| WO | 2009/072478 | 6/2009 |
| WO | 2010/010838 | 1/2010 |
| WO | 2011/046011 | 3/2013 |

*Primary Examiner* — Jane L Stanley
(74) *Attorney, Agent, or Firm* — Hamre, Schumann, Mueller & Larson, P.C.

(57) ABSTRACT

The present invention aims to provide a conductive layered body having excellent solvent resistance and scratch resistance as well as a low haze value and a significantly high light transmittance. The present invention relates to a conductive layered body including, as an outermost layer thereof, a conductive layer containing a conductive fibrous filler, wherein the conductive layered body has a Martens hardness of 150 to 3,000 N/mm² as measured at an indentation depth of 100 nm from a surface, and a ratio, in atomic percentage, of a conductive material element constituting the conductive fibrous filler on an outermost surface-side surface of the conductive layer is 0.15 to 5.00 at %.

10 Claims, No Drawings

ELECTROCONDUCTIVE LAYERED PRODUCT, TOUCH PANEL, AND PROCESS FOR PRODUCING ELECTROCONDUCTIVE LAYERED PRODUCT

TECHNICAL FIELD

The present invention relates to conductive layered bodies, touch panels, and methods of producing conductive layered bodies.

BACKGROUND ART

Transparent, conductive thin films have been used as transparent electrodes of, for example, displays such as liquid crystal displays (LCDs) and plasma display panels (PDPs), touch panels, and solar batteries. Examples of such thin films that have been used include transparent conductive sheets composed of a conductive layer made of indium tin oxide (ITO) or the like disposed on a glass substrate.

The transparent conductive sheets including glass substrates, however, have poor flexibility. In recent years, therefore, conductive films have been primarily used which are produced by forming a conductive layer made of ITO or the like by vacuum deposition or sputtering on a substrate film made of a flexible resin such as polyester (PET) or polyethylene naphthalate (PEN).

Unfortunately, the conductive layer made of ITO or the like is not pliable, and thus likely to cause cracking when formed on the substrate film made of a flexible resin.

In contrast, for example, a known transparent conductor has a transparent conductive layer containing metal nanowire formed on a substrate (see, for example, Patent Literature 1).

The transparent conductor disclosed in Patent Literature 1 is produced by applying an aqueous dispersion of metal nanowire in a dispersion medium onto a substrate, preferably onto a hydrophilic polymer layer formed on a substrate, followed by drying to form a transparent conductive layer. In the transparent conductor produced by this method, the metal nanowire is embedded in the substrate or the hydrophilic polymer layer.

Such a transparent conductor, however, is disadvantageously poor in solvent resistance and scratch resistance because the surface of the substrate with the embedded metal nanowire is uncured.

Patent Literature 2, for example, discloses a method of producing a transparent conductive film by forming a transparent conductive layer on a substrate, further forming a cured film on the transparent conductive layer, and then patterning the transparent conductive layer by etching. Such a method including the formation of a cured film on a transparent conductive layer is expected to improve solvent resistance and scratch resistance.

However, in the transparent conductive film having a cured film on a transparent conductive layer, the cured film on the transparent conductive layer has to be thin because a thick cured layer leads to a higher surface resistance and to the need for a longer time for etching the transparent conductive layer.

Since it is difficult to form thin cured films, polymer materials with good film forming properties are often particularly selected. Such polymer materials with good film forming properties, however, form cured films having poor hardness. Even if high-hardness monomers are used, the small thickness of the film causes incomplete curing, disadvantageously resulting in insufficient scratch resistance.

A method of producing a conductive film by what is called a transfer process is also known. In the process, a conductive layer is formed on a support and then transferred to a substrate film (see, for example, Patent Literatures 3 and 4). Such a conductive film is expected to have improved solvent resistance and scratch resistance.

For image display devices, however, increasingly higher optical performance levels are demanded, so that the conductive films are also required to have excellent optical performance, especially a low haze value and a significantly high light transmittance. Conventional conductive films having conductive layers formed by the transfer process are hardly sufficient in such optical performance.

CITATION LIST

Patent Literature

Patent Literature 1: JP 2010-084173 A
Patent Literature 2: JP 2014-188828 A
Patent Literature 3: JP 2009-252493 A
Patent Literature 4: JP 5430792 B

SUMMARY OF INVENTION

Technical Problem

In view of the situation in the art, the present invention aims to provide a conductive layered body having excellent solvent resistance and scratch resistance as well as a low haze value and a significantly high light transmittance, a touch panel including the conductive layered body, and a method of producing a conductive layered body.

Solution to Problem

The present invention is directed to a conductive layered body including, as an outermost layer thereof, a conductive layer containing a conductive fibrous filler, wherein the conductive layered body has a Martens hardness of 150 to 3,000 N/mm$^2$ as measured at an indentation depth of 100 nm from a surface, and a ratio, in atomic percentage, of a conductive material element constituting the conductive fibrous filler on an outermost surface-side surface of the conductive layer is 0.15 to 5.00 at %.

Preferably, the conductive layered body of the present invention has a total light transmittance of 80% or higher and a haze of 5% or lower.

Preferably, the conductive layer contains a binder resin and has the conductive fibrous filler contained in the binder resin, and part of the conductive fibrous filler protrudes from the outermost surface-side surface of the conductive layer.

Preferably, the conductive layer has a thickness smaller than a fiber size of the conductive fibrous filler.

Preferably, the conductive fibrous filler has a fiber size of 200 nm or smaller and a fiber length of 1 μm or greater.

Preferably, the conductive fibrous filler is at least one selected from the group consisting of conductive carbon fibers, metal fibers, and metal-coated synthetic fibers.

Preferably, in the conductive layered body of the present invention, the conductive layer is on a resin layer.

The present invention is also directed to a touch panel including the conductive layered body of the present invention.

The present invention is also directed to a method of producing a conductive layered body including, as an outermost layer thereof, a conductive layer containing a conductive fibrous filler, the method including a transferring step of transferring the conductive layer to a receiver using a transfer film having at least the conductive layer on a release film.

In the method of producing a conductive layered body of the present invention, preferably, the conductive layered body has a haze value of 5% or lower and a total light transmittance of 80% or higher.

Preferably, the conductive layer in the transfer film contains a binder resin and has the conductive fibrous filler contained in the binder resin, and part of the conductive fibrous filler protrudes from a surface of the conductive layer on the side opposite the release film.

Preferably, the conductive layer has a thickness smaller than a fiber size of the conductive fibrous filler.

Preferably, the conductive fibrous filler has a fiber size of 200 nm or smaller and a fiber length of 1 μm or greater.

Preferably, the conductive fibrous filler is at least one selected from the group consisting of conductive carbon fibers, metal fibers, and metal-coated synthetic fibers.

Preferably, the method further includes a treatment step of subjecting the conductive layer to ultraviolet irradiation and/or heating.

Preferably, the receiver is a resin layer.

The present invention will be described in detail below.

The "resin" as used herein includes a monomer, an oligomer, and a polymer, if not otherwise specified.

The present invention is directed to a conductive layered body including, as an outermost layer thereof, a conductive layer containing a conductive fibrous filler.

The present inventors made intensive studies to find out the following: The conductive layered body including, as an outermost layer thereof, a conductive layer containing a conductive fibrous filler can have excellent solvent resistance and scratch resistance as well as a low haze value and a significantly high light transmittance when the surface hardness is within a predetermined range and the conductive material element constituting the conductive fibrous filler is present at a predetermined ratio on the outermost surface-side surface of the conductive layer. The inventors thus completed the present invention.

The conductive layered body of the present invention has a Martens hardness of 150 to 3,000 N/mm$^2$ as measured at an indentation depth of 100 nm from a surface. The "surface" means the outermost surface of the conductive layered body of the present invention on the conductive layer side.

If the Martens hardness is smaller than 150 N/mm$^2$ as measured at an indentation depth of 100 nm from the surface, the conductive layered body of the present invention is easily scratched in the production process. If the Martens hardness is greater than 3,000 N/mm$^2$, the etching rate may be reduced, or the problem of cracking in bending is more likely to occur. The lower limit of the Martens hardness as measured at an indentation depth of 100 nm from the surface is preferably 200 N/mm$^2$, and the upper limit thereof is preferably 1,000 N/mm$^2$. The lower limit is more preferably 250 N/mm$^2$, and the upper limit is more preferably 500 N/mm$^2$.

The "Martens hardness" as used herein is the Martens hardness measured at an indentation depth of 100 nm from the surface using an ultramicrohardness measuring system "PICODENTOR" produced by Fischer.

The conductive layered body of the present invention preferably has a high Martens hardness at a position closer to the outermost surface. Specifically, the conductive layered body preferably has a Martens hardness of 1,000 to 40,000 N/mm$^2$ as measured at an indentation depth of 5 to 10 nm from the surface. With such a Martens hardness, even after resistance tests such as a solvent resistance test or a scratch resistance test are conducted on the conductive layered body of the present invention, the scratch resistance and solvent resistance before the resistance tests are more likely to be maintained.

The conductive layered body of the present invention preferably has a Martens hardness of 20 to 1,000 N/mm$^2$ as measured at an indentation depth of 500 to 1,000 nm from the surface. Such a Martens hardness leads to a good hardness balance of the entire conductive layered body of the present invention, making it easy to improve the characteristics of the conductive layered body of the present invention such as the etching rate or adhesiveness. The "indentation depth of 500 to 1,000 nm from the surface" means a depth below the interface between the conductive layer and a lower layer formed on the side opposite the outermost surface-side surface of the conductive layer, that is, a depth on the lower layer side.

In some production methods, solvents or some resin components can be dissolved and penetrate the lower layer of the conductive layered body of the present invention. If this makes the lower layer too much softer than the Martens hardness of the conductive layer, the indentation depth from the surface may be affected by the physical properties. It is thus more preferred that the Martens hardness balance of the entire conductive layered body of the present invention is within an appropriate range with respect to the Martens hardness at an indentation depth of 100 nm from the surface.

The conductive layer contains a conductive fibrous filler.

In the present invention, the conductive layer may contain a binder resin in addition to the conductive fibrous filler. In this case, preferably, part of the conductive fibrous filler protrudes from the outermost surface-side surface (hereinafter also referred to simply as a "surface") of the conductive layer.

The conductive layered body having such a conductive layer can have a low haze value and a high light transmittance.

Furthermore, when the conductive fibrous filler is contained in the binder resin, the conductive layer can have particularly excellent scratch resistance.

Any binder resin may be used. For example, the binder resin is preferably transparent. For example, the binder resin is preferably a cured product obtained by curing an ionizing radiation-curable resin by ultraviolet irradiation or electron beam irradiation. The ionizing radiation-curable resin is a resin that can be cured by irradiation with ultraviolet light or electron beam.

The ionizing radiation-curable resin may be a compound having one or two or more unsaturated bonds. Examples thereof include compounds having acrylate functional groups. Examples of compounds having one unsaturated bond include ethyl (meth)acrylate, ethylhexyl (meth)acrylate, styrene, methylstyrene, and N-vinylpyrrolidone. Examples of compounds having two or more unsaturated bonds include polyfunctional compounds such as trimethylolpropane tri(meth)acrylate, tripropylene glycol di(meth)acrylate, diethylene glycol di(meth)acrylate, dipropylene glycol di(meth)acrylate, pentaerythritol tri(meth)acrylate, pentaerythritol tetra(meth)acrylate, dipentaerythritol hexa(meth)acrylate, 1,6-hexanediol di(meth)acrylate, neopentyl glycol di(meth)acrylate, trimethylolpropane tri(meth)acrylate, ditrimethylolpropane tetra(meth)acrylate, dipentaerythritol penta(meth)acrylate, tripentaerythritol octa(meth)acrylate, tetrapentaerythritol deca(meth)acrylate, isocyanuric acid tri(meth)acrylate, isocyanuric acid di(meth)acrylate, polyester tri(meth)acrylate, polyester di(meth)acrylate, bisphenol di(meth)acrylate, diglycerin tetra(meth)acrylate, adamantyl di(meth)acrylate, isobornyl di(meth)acrylate, dicyclopentane di(meth)acrylate, tricyclodecane di(meth) acrylate, and ditrimethylolpropane tetra(meth)acrylate. Suitable among them are pentaerythritol triacrylate (PETA), dipentaerythritol hexaacrylate (DPHA), and pentaerythritol tetraacrylate (PETTA). The "(meth)acrylate" as used herein refers to methacrylate and acrylate. In the present invention, the ionizing radiation-curable resin may be one obtained by modifying any of the above compounds with PO, EO, or the like.

Examples of resins usable as the ionizing radiation-curable resin other than the above compounds include polyester resin, polyether resin, acrylic resin, epoxy resin, urethane resin, alkyd resin, spiro-acetal resin, polybutadiene resin, and polythiol-polyene resin, which have an unsaturated double bond and a relatively low molecular weight The ionizing radiation-curable resin may be used in combination with a solvent drying-type resin (a resin such as a thermoplastic resin, that can be formed into a coating film by simply drying the solvent added before application for adjustment of the solids content). The combined use with the solvent drying-type resin effectively prevents defective coating on the surface to which the coating solution is applied in forming the conductive layer.

Any solvent drying-type resin may be used in combination with the ionizing radiation-curable resin. A thermoplastic resin can be generally used.

Any thermoplastic resin may be used. Examples thereof include styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins, and rubbers and elastomers. The thermoplastic resin is preferably amorphous and soluble in organic solvents (in particular, common solvents capable of dissolving multiple polymers or curable compounds therein). From the standpoint of transparency and weather resistance, preferred thermoplastic resins include styrene resins, (meth)acrylic resins, alicyclic olefin resins, polyester resins, and cellulose derivatives (e.g., cellulose esters).

The conductive layer may contain a thermosetting resin.

Any thermosetting resin may be used. Examples thereof include phenolic resin, urea resin, diallyl phthalate resin, melamine resin, guanamine resin, unsaturated polyester resin, polyurethane resin, epoxy resin, aminoalkyd resin, melamine-urea co-condensation resin, silicon resin, and polysiloxane resin.

The conductive layer containing the binder resin may be formed by, for example, applying to a substrate film (described later) a composition for a conductive layer containing the conductive fibrous filler, the monomer component of the ionizing radiation-curable resin, and a solvent, drying the composition to form a coating film, and curing the coating film by ionizing radiation irradiation.

Examples of the solvent contained in the composition for a conductive layer include alcohols (e.g., methanol, ethanol, propanol, isopropanol, n-butanol, s-butanol, t-butanol, benzyl alcohol, PGME, ethylene glycol), ketones (e.g., acetone, methyl ethyl ketone, methyl isobutyl ketone, cyclohexanone), ethers (e.g., dioxane, tetrahydrofuran), aliphatic hydrocarbons (e.g., hexane), alicyclic hydrocarbons (e.g., cyclohexane), aromatic hydrocarbons (e.g., toluene, xylene), carbon halides (e.g., dichloromethane, dichloroethane), esters (e.g., methyl acetate, ethyl acetate, butyl acetate), cellosolves (e.g., methyl cellosolve, ethyl cellosolve), cellosolve acetates, sulfoxides (e.g., dimethyl sulfoxide), and amides (e.g., dimethylformamide, dimethylacetamide). Mixtures thereof may be used.

The composition for a conductive layer preferably further contains a photopolymerization initiator.

The photopolymerization initiator is not limited, and may be a known polymerization initiator. Specific examples thereof include acetophenones, benzophenones, Michler's benzoyl benzoate, α-amyloxime ester, thioxanthones, propiophenones, benzyls, benzoins, and acylphosphine oxides. The photopolymerization initiator is preferably mixed with a photosensitizer. Specific examples thereof include n-butylamine, triethylamine, and poly-n-butylphosphine.

When the resin component contained in the composition for a conductive layer is a resin having a radically polymerizable unsaturated group, the photopolymerization initiator is preferably one or a mixture of two or more of acetophenones, benzophenones, thioxanthones, benzoin, benzoin methyl ether, and the like. When the resin component is a resin having a cationically polymerizable functional group, the photopolymerization initiator is preferably one or a mixture of two or more of aromatic diazonium salts, aromatic sulfonium salts, aromatic iodonium salts, metallocene compounds, benzoinsulfonic acid esters, and the like.

In the composition for a conductive layer, the photopolymerization initiator content is preferably 0.5 to 10.0 parts by mass relative to 100 parts by mass of the resin component. If the photopolymerization initiator content is less than 0.5 parts by mass, the conductive layer to be formed may have an insufficient hardness. If the photopolymerization initiator content is more than 10.0 parts by mass, the photopolymerization initiator can inhibit curing.

The raw material content (solids content) of the composition for a conductive layer is not limited, but is typically 5 to 70% by mass, particularly preferably 25 to 60% by mass.

According to the purposes such as an increase in the hardness of the conductive layer, a reduction in curing shrinkage, or control of the refractive index, the composition for a conductive layer may contain conventionally known additives such as a dispersant, a surfactant, an antistatic agent, a silane coupling agent, a thickener, a discoloration inhibitor, a colorant (pigment, dye), a defoamer, a leveling agent, a flame retardant, a ultraviolet absorber, a tackifier, a polymerization inhibitor, an antioxidant, or a surface modifier.

Preferred leveling agents include silicone oil and fluorine-based surfactants because they prevent the curable resin layer from having a Bénard cells structure. When a resin composition containing a solvent is applied and dried, a surface tension difference occurs between the surface and the inside of the coating film, and this causes many convection currents in the coating film. The structure formed by this convection is called Bénard cell structure. The Bénard cell structure causes problems on the resulting conductive layer such as orange peel or defective coating.

The composition for a conductive layer may be prepared by any method that allows uniform mixing of the components. For example, the composition can be prepared with a known device such as a paint shaker, a bead mill, a kneader, or a mixer.

The composition for a conductive layer may be applied to the substrate film by any method. For example, a known method may be used such as spin coating, dipping, spraying, die coating, bar coating, roll coating, meniscus coating, flexo printing, screen printing, or bead coating.

In curing the dried coating film, the ionizing radiation irradiation may be conducted using a light source such as an ultra high pressure mercury lamp, a high pressure mercury lamp, a low pressure mercury lamp, a carbon-arc lamp, a black light fluorescent lamp, or a metal halide lamp.

The wavelength of ultraviolet light may be in the range of 190 to 380 nm. Specific examples of the electron beam source include electron beam accelerators such as Cockcroft-Walton accelerators, Van de Graaff accelerators, resonance transformer accelerators, insulated core transformer accelerators, linear accelerators, Dynamitron accelerators, and high-frequency accelerators.

When the conductive layer contains the binder resin, the cured product of the binder resin (hereinafter also referred to as a "binder resin layer") in the conductive layer preferably has a thickness smaller than the fiber size of the conductive fibrous filler. If the thickness of the binder resin layer is equal to or greater than the fiber size of the conductive fibrous filler, an increased amount of binder resin enters the contact points between fibers forming the conductive fibrous filler, thus deteriorating the continuity of the conductive layer. This may prevent the conductive layered body of the present invention from achieving the target resistance value.

Specifically, the thickness of the binder resin layer is preferably 200 nm or smaller. If the thickness of the binder resin layer is greater than 200 nm, the fiber size of the conductive fibrous filler has to be greater than the appropriate range described later. Such a fiber size may lead to an increase in the haze of the conductive layered body and a reduction in the total light transmittance. The thickness of the binder resin layer greater than 200 nm is thus optically unsuitable.

The thickness of the binder resin layer is more preferably 50 nm or smaller, still more preferably 30 nm or smaller.

When the conductive layer does not contain the binder resin, the conductive layer consists of the conductive fibrous filler. In a cross section of the layer in the thickness direction, there are thus observed portions with conductive fibrous filler and portions without any conductive fibrous filler. The portions with the conductive fibrous filler can include portions where the fibers forming the conductive fibrous filler exist singly, and portions where two or more fibers forming the conductive fibrous filler are stacked on top of one another. However, because of the presence of the portions without any conductive fibrous filler (i.e., portions with a thickness of 0 nm), the thickness of the conductive layer not containing the binder resin as measured in accordance with the definition below is also usually smaller than the fiber size of the conductive fibrous filler.

The thickness of the conductive layer can be determined as follows. A cross section of the conductive layer is observed using, for example, an electron microscope such as SEM, STEM, or TEM at a 1,000- to 500,000-fold magnification, and the thickness is measured at 10 random sites. The thickness of the conductive layer is determined as the average of the 10 site.

The conductive fibrous filler preferably has a fiber size of 200 nm or smaller and a fiber length of 1 μm or greater.

If the fiber size is greater than 200 nm, the conductive layered body to be produced may have a high haze value or an insufficient light transmittance. The lower limit of the fiber size of the conductive fibrous filler is preferably 10 nm from the standpoint of the conductivity of the conductive layer. The fiber size is more preferably within the range of 15 to 180 nm.

If the fiber length of the conductive fibrous filler is smaller than 1 μm, the conductive layer to be formed may have insufficient conductivity. In addition, the conductive fibrous filler may coagulate to cause an increase in the haze value and a decrease in the light transmittance. Thus, the upper limit of fiber length is preferably 500 μm, and the fiber length is more preferably within the range of 3 to 300 μm, still more preferably within the range of 10 to 30 μm.

The fiber size and fiber length of the conductive fibrous filler can be determined as follows. The fiber size and the fiber length are each measured at 10 sites using, for example, an electron microscope such as SEM, STEM, or TEM at a 1000- to 500,000-fold magnification. The fiber size and the fiber length each can be determined as the average of the 10 sites.

The conductive fibrous filler is preferably at least one selected from the group consisting of conductive carbon fibers, metal fibers, and metal-coated synthetic fibers.

Examples of the conductive carbon fibers include vapor grown carbon fiber (VGCF), carbon nanotube, wire cup, and wire wall. The conductive carbon fibers may be used alone or in combination of two or more thereof.

Examples of usable metal fibers include fibers produced by a drawing method involving drawing stainless steel, iron, gold, silver, aluminum, nickel, titanium, or the like into thin, long fibers, and fibers produced by a cutting method involving cutting any of such metals. These metal fibers may be used alone or in combination of two or more thereof.

Examples of the metal-coated synthetic fibers include acrylic fibers coated with gold, silver, aluminum, nickel, titanium, or the like. These metal-coated synthetic fibers may be used alone or in combination of two or more thereof.

When the conductive layer contains the binder resin, the conductive fibrous filler content is preferably, for example, 20 to 3,000 parts by mass relative to 100 parts by mass of the binder resin. If the conductive fibrous filler content is less than 20 parts by mass, the conductive layer to be formed may have insufficient conductivity. If the conductive fibrous filler content is more than 3,000 parts by mass, the conductive layered body of the present invention may have a high haze or an insufficient light transmittance. In addition, an increased amount of binder resin may enter contact points between the fibers of the conductive fibrous filler, thus deteriorating the continuity of the conductive layer. This may prevent the conductive layered body of the present invention from achieving the target resistance value. The lower limit of the conductive fibrous filler content is more preferably 50 parts by mass. The upper limit thereof is more preferably 1,000 parts by mass.

When the conductive layer contains the binder resin, preferably, part of the conductive fibrous filler protrudes from the surface of the conductive layer.

As described later, in the case of producing the conductive layered body of the present invention by a transfer process using a transfer film, the transfer film is stacked on a receiver with the conductive layer side surface facing the receiver, followed by application of pressure. When the conductive fibrous filler protrudes from the surface of the conductive layer on the side opposite the release film (i.e., the surface of the conductive layer to be pressed against the receiver), the protruding conductive fibrous filler is embedded in the receiver in transferring. As a result, the obtained conductive layered body has an improved solvent resistance, which enables suitable formation of conductive pattern by etching or the like. The obtained conductive layered body also has excellent scratch resistance.

When the conductive layer contains the binder resin, preferably, part of the conductive fibrous filler protrudes from the surface of the conductive layer in the range of 5 to 600 nm. In the present invention, the vertical distance from a flat portion having no conductive fibrous filler protruding therefrom in the surface of the conductive layer to the tip of the protruding conductive fibrous filler is preferably within the range of 5 to 600 nm. If the vertical distance is smaller than 5 nm, the solvent resistance of the conductive layered body of the present invention may not be improved. If the vertical distance is greater than 600 nm, the conductive fibrous filler may fall off the conductive layer. The lower limit of the vertical distance is more preferably 10 nm. The upper limit is more preferably 200 nm.

The vertical distance from the flat portion to the tip of the conductive fibrous filler protruding from the surface of the conductive layer can be determined as follows. The surface of the conductive layer is observed by, for example, an electron microscope such as SEM, STEM, or TEM at a 1,000- to 500,000-fold magnification. The vertical distance from a flat portion on the surface of the conductive layer to the tip of the conductive fibrous filler is measured at 10 sites. The vertical distance is determined as the average of the 10 sites.

In the conductive layered body of the present invention, the ratio, in atomic percentage, of the conductive material element constituting the conductive fibrous filler on the surface of the conductive layer is 0.15 to 5.00 at %. If the ratio is less than 0.15 at %, disadvantages may arise such as insufficient conductivity of the conductive layered body of the present invention or a slow etching rate. If the ratio is more than 5.00 at %, the conductive layered body of the present invention has a low light transmittance and also has poor scratch resistance. The lower limit of the ratio of the conductive material element constituting the conductive fibrous filler present on the surface of the conductive layer is preferably 0.20 at %, and the upper limit is preferably 2.00 at %. The lower limit is more preferably 0.30 at %, and the upper limit is more preferably 1.00 at %.

The ratio of the conductive material element constituting the conductive fibrous filler present on the surface of the conductive layer can be measured by X-ray photoelectron spectroscopy under the following conditions.
Accelerating voltage: 15 kV
Emission current: 10 mA
X-ray source: Al dual anode
Measurement area: 300×700 μmφ
Measurement at a depth of 10 nm from the surface
The average of three measurements (n=3)

The conductive layer with such a surface preferably has unevenness on the surface resulting from the conductive fibrous filler, to the extent that the conductive layered body can achieve solvent resistance and scratch resistance as well as a low haze value and a significantly high light transmittance.

The conductive layered body of the present invention may be produced by any method that satisfies the above Martens hardness and atomic percentage. A preferred method includes a transferring step of transferring the conductive layer to a receiver using a transfer film having at least the conductive layer on a release film. The present invention also encompasses such a method of producing the conductive layered body of the present invention.

In the transferring step, a transfer film having at least the conductive layer on a release film is used.

The receiver may be any component on which the conductive layer can be formed. Examples thereof include substrates made of any material (e.g., glass, resins, metals, ceramics) and receiver layers formed on these substrates, such as resin layers and adhesive layers.

The receiver is preferably a resin layer formed on a substrate film on which a transparent electrode of, for example, a display (e.g., LCD), a touch panel, or a solar battery is to be formed using the conductive layer.

In other words, in the conductive layered body of the present invention, the conductive layer is preferably on a resin layer.

The substrate film is not limited. Examples include films of polyester resins, acetate resins, polyethersulfone resins, polycarbonate resins, polyamide resins, polyimide resins, polyolefin resins, (meth)acrylic resins, polyvinyl chloride resins, polyvinylidene chloride resins, polystyrene resins, polyvinyl alcohol resins, polyarylate resins, and polyphenylene sulfide resin. Suitable among them are films of polyester resins, polycarbonate resins, and polyolefin resins.

Other examples of the substrate film include films of amorphous olefin polymers (cyclo-olefin-polymers: COPs) having alicyclic structures. These are substrates containing norbornene polymers, monocyclic olefin polymers, cyclic conjugated diene polymers, vinyl alicyclic hydrocarbon polymers, or the like. Examples thereof include ZEONEX and ZEONOR (norbornene resins) produced by Zeon Corporation, SUMILITE FS-1700 produced by Sumitomo Bakelite Co., Ltd., ARTON (modified norbornene resin) produced by JSR Corporation, APEL (cyclic olefin copolymer) produced by Mitsui Chemicals, Inc., Topas (cyclic olefin copolymer) produced by Ticona, and OPTOREZ OZ-1000 series (alicyclic acrylic resin) produced by Hitachi Chemical Co., Ltd.

Preferable alternative substrates for triacetyl cellulose include FV series (films with a low birefringence and a low modulus of photoelasticity) produced by Asahi Kasei Chemicals Corporation.

The substrate film preferably has a thickness of 1 to 100 μm. If the thickness is smaller than 1 μm, the receiver may have insufficient mechanical strength. If the thickness is greater than 100 μm, the conductive film may have insufficient flexibility. The lower limit of the thickness of the substrate film is more preferably 20 μm, and the upper limit thereof is more preferably 80 μm. The lower limit is still more preferably 40 μm, and the upper limit is still more preferably 60 μm.

The surface of the substrate film may be subjected in advance to etching treatments such as sputtering, corona discharge, ultraviolet irradiation, electron beam irradiation, chemical conversion, or oxidation, or primer treatments. Performing these treatments in advance can improve adhesiveness to the resin layer to be formed on the substrate film. In addition, prior to the formation of the resin layer, the surface of the substrate film may be subjected to dust removal and cleaning by solvent cleaning, ultrasonic cleaning, or the like, if necessary.

The transfer film may include any release film. For example, an untreated polyethylene terephthalate (PET) film is suitably used. The untreated PET film has excellent conductive layer releasability after transferring the conductive layer to the receiver. It is also less expensive than films made of other materials, such as surface-treated PET films or COP films, thus preventing an increase in the production cost of the conductive layered body of the present invention.

Examples of the method for transferring the conductive layer to a receiver using the transfer film include a method involving stacking the transfer film on the receiver with the conductive layer facing the receiver, applying pressure to the stack, and then removing the release film.

In the method of producing a conductive layered body of the present invention, the receiver is preferably a resin layer, as described above. Preferably, after a coating film is formed with a composition for a resin layer having the same formulation as the composition for a conductive layer, the coating film is not completely cured but left uncured, and the conductive layer is transferred to the uncured coating film as the receiver by the above method, followed by complete curing of the uncured coating film by the treatment step.

As described above, in the conductive layer in the transfer film, it is preferred that part of the conductive fibrous filler protrudes from the surface on the side opposite the release film, and that the protruding conductive fibrous filler is embedded in the receiver. When the receiver is an uncured coating film, the conductive fibrous filler can be suitably embedded. Examples of the conductive fibrous filler include the same conductive fibrous fillers as those described for the conductive layered body of the present invention.

The conductive layered body of the present invention can be produced by transferring the conductive layer to the receiver using the transfer film, but the transfer film may have a coating resin layer, for example, on the surface of the conductive layer on the side opposite the release film, and the conductive layer may be transferred together with the coating resin layer by the above method using the transfer film. In this case, the conductive layer is transferred to the receiver via the coating resin layer. The coating resin layer is not limited, and may be made of the same material as the resin layer, for example.

In the conductive layered body of the present invention, the ratio, in atomic percentage, of the conductive material element constituting the conductive fibrous filler on the surface (the surface on the side of the release film) of the conductive layer is 0.15 to 5.00 at %; however, when the coating resin layer is formed, the atomic percentage on the surface of the conductive layer on the side opposite the coating resin layer is within the above range. To satisfy this atomic percentage requirement, the coating resin layer needs to be as thin as about 1 to 200 nm, for example. The atomic percentage on the surface of the conductive layer thus limits the structure, surface state, and the like of the coating resin layer or other layer(s) formed on the conductive layer.

In the method of producing a conductive layered body of the present invention, when the conductive layer contains the binder resin, the method preferably further includes a treatment step of subjecting the conductive layer to ultraviolet irradiation and/or heating. When the transfer film contains the coating resin layer, the conductive layer may be subjected to the ultraviolet irradiation and/or heating together with the coating resin layer in the treatment step. The treatment step allows the produced conductive layered body to have more excellent conductivity.

The treatment step may be conducted before or after the transferring step. Alternatively, the step may be conducted before removing the release film in the transferring step.

In cases where ultraviolet irradiation is conducted in the treatment step, for example, a known flash lamp is preferably used to achieve a conductive layered body having more excellent conductivity. Light from a flash lamp with wavelengths from UV to visible light can intensively heat the surface of the conductive layer. Thus, as compared with conventional heat sources, the flash lamp significantly minimizes thermal effect on the layer(s) or substrate film beneath the conductive layer. In other words, the flash lamp can advantageously instantaneously heat only the surface layer.

The ultraviolet irradiation may be conducted under any conditions, but irradiation with ultraviolet light at about 50 to 3,000 mJ is preferred.

In cases where heating is conducted in the treatment step, the heating is preferably conducted under the conditions of a temperature of 110° C. to 150° C. for about 1 to 30 minutes, for example.

The conductive layered body of the present invention produced in the above manner has both a low haze value and a high transparency. Specifically, the conductive layered body preferably has a haze value of 5% or lower and a total light transmittance of 80% or higher. If the haze value is higher than 5% or the total light transmittance is lower than 80%, the optical performance is insufficient. The upper limit of the haze value is preferably 1.5%, more preferably 1.2%. The lower limit of the total light transmittance is preferably 88%, and the lower limit thereof is more preferably 89%.

The haze value is the sum of the internal haze value and the surface haze value, and measured in accordance with JIS K-7136 (2000). The measurement may be conducted using a reflectance/transmittance measuring device HM-150 (Murakami Color Research Laboratory Co., Ltd.), for example.

The total light transmittance is measured in accordance with JIS K-7361-1 (1997). The measurement may be conducted using a reflectance/transmittance measuring device HM-150 (Murakami Color Research Laboratory Co., Ltd.), for example.

The value of the haze derived from the conductive fibrous filler is preferably 4% or lower, more preferably 1.5% or lower, still more preferably 1.0% or lower. The value of the haze derived from the conductive fibrous filler is measured as follows. A sample 0 is prepared by bonding, using optically clear adhesive tape (OCA), glass to both sides of a film similar to the conductive layer except that it does not contain the conductive fibrous filler. The haze of the sample 0 is measured and taken as H0. A sample 1 is prepared by bonding glass to both sides of the conductive layer containing the conductive fibrous filler using OCA. The haze of the sample 1 is measured and taken as H1. The haze determined by calculating H1-H0 is taken as the value of the haze derived from the conductive fibrous filler.

The glass of the samples for the measurement of the haze value derived from the conductive fibrous filler is 1.1-mm-thick soda glass, and the OCA is OCA 8146-2 (tape thickness: 50 μm) produced by 3M.

The conductive layered body of the present invention has excellent scratch resistance. For example, preferably, no scratch or no significant increase in the resistance is observed on the surface of the conductive layer on the side opposite the receiver after waste cloth mounted on a jig (1 kg/4 cm$^2$) is reciprocated five times with a Gakushin-type rubbing tester on the surface of the conductive layer on the side opposite the receiver.

The conductive layered body of the present invention can be used as a transparent electrode of, for example, displays such as liquid crystal displays (LCDs), and plasma display panels (PDPs), touch panels, and solar batteries. A touch panel including the conductive layered body of the present invention is also encompassed by the present invention.

Advantageous Effects of Invention

The conductive layered body of the present invention has the above-described structure and thus has a low haze value and a significantly high light transmittance. The conductive layered body of the present invention is therefore suitable for use as a transparent electrode of, for example, displays such as liquid crystal displays (LCDs) and plasma display panels (PDPs), touch panels, and solar batteries. The conductive layered body is especially suitable for touch panels.

The method of producing a conductive layered body of the present invention has the above-described features and thus can suitably produce a conductive layered body having a low haze value and a significantly high light transmittance.

DESCRIPTION OF EMBODIMENTS

The present invention will be described in more detail below with reference to examples and comparative examples. The present invention should not be limited only to these examples and comparative example.

The "part(s)" and "%" herein are based on mass if not otherwise specified.

EXAMPLE 1

(Production of Transfer Film)

A 50-μm-thick polyester film (A4100, Toyobo Co., Ltd.) was used as a release film. The composition for a conductive layer described below was applied to the untreated surface of the polyester film to 10 mg/m² to form a coating film. The coating film was dried at 70° C. for one minute and then irradiated with ultraviolet light at UV 50 mJ to form a conductive layer, whereby producing a transfer film.

(Preparation of Composition for Conductive Layer)

A silver nanowire dispersion was prepared by separately conducting the following core forming step and particle growing step using ethylene glycol (EG) serving as a reducing agent and polyvinylpyrrolidone (PVP:PVP: average molecular weight: 1,300,000, Aldrich) serving as both a morphology controlling agent and a protective colloid agent.

(Core Forming Step)

While stirring 100 mL of EG liquid held at 160° C. in a reaction container, 2.0 mL of a silver nitrate solution (silver nitrate concentration: 1.0 mol/L) in EG was added at a constant flow rate over one minute.

Subsequently, while holding the mixture at 160° C. for 10 minutes, silver ions were reduced to silver core particles. The reaction solution was yellow due to the surface plasmon absorption of nano-sized silver microparticles, confirming that the silver ions were reduced to silver microparticles (core particle).

Subsequently, 10.0 mL of a PVP solution (PVP concentration: $3.0 \times 10^{-1}$ mol/L) in EG was added at a constant flow rate over 10 minutes.

(Particle Growing Step)

The reaction solution containing the core particles after the completion of the core forming step was held at 160° C. while stirring, and 100 mL of a silver nitrate solution (silver nitrate concentration: $1.0 \times 10^{-1}$ mol/L) in EG and 100 mL of a PVP solution (PVP concentration: $3.0 \times 10^{-1}$ mol/L) in EG were added by a double-jet method at a constant flow rate over 120 minutes.

During this particle growing step, samples of the reaction solution were taken once every 30 minutes and observed with an electron microscope. The observation showed that the core particles formed in the core forming step grew into a wire form with time, and no new microparticles were formed in the particle grown step. An electron micrograph of the final silver nanowire was taken, and the particle size in the major axis direction and that in the minor axis direction were measured on images of 300 silver nanowire particles. The arithmetic average was determined for each particle size. The average particle size in the minor axis direction was 100 nm, and the average length in the major axis direction was 40 μm.

(Desalting/Water Washing Step)

The reaction solution after the completion of the particle growing step was cooled to room temperature. The reaction solution was then subjected to desalting/water washing treatment with an ultrafiltration membrane with a molecular cutoff of 0.2 μm while the solvent was replaced with ethanol. Finally, the reaction solution was concentrated to a solution amount of 100 mL, whereby preparing a silver nanowire dispersion in EtOH.

The obtained silver nanowire dispersion in EtOH was mixed with PET-30 (Nippon Kayaku Co., Ltd.), IRGACURE 184 (BASF), and a dilution solvent such that the silver nanowire concentration was 0.1% by mass, the amount of PET-30 was 0.1% by mass, and the amount of IRGACURE 184 relative to PET-30 was 5%, thus preparing a composition for a conductive layer. The dilution solvent contained 30% by mass of cyclohexanone.

(Production of Receiver)

A 50-μm-thick polyester film (A4100, Toyobo Co., Ltd.) was used as a substrate film. A composition for a hard coat layer having the formulation below was applied to the primer-treated surface of the polyester film to a dried thickness of 2 μm to form a coating film. The coating film was dried at 70° C. for one minute to produce a receiver having a hard coat layer on the substrate film.

(Composition for Hard Coat Layer)

KAYARAD PET-30 (pentaerythritol triacrylate/pentaerythritol tetraacrylate mixture, Nippon Kayaku Co., Ltd.) 30% by mass
IRGACURE 184 (BASF) 1.5% by mass
MEK 50% by mass
Cyclohexanone 18.5% by mass The transfer film was laminated to the receiver with the conductive layer side of the transfer film in contact with the hard coat layer of the receiver. The laminate in the bonded state was then irradiated with ultraviolet light (600 mJ) from the transfer film side. The laminate may be irradiated with ultraviolet light from the receiver side.

The release film was then removed from the transfer film to provide a conductive layered body having the conductive layer transferred to the receiver.

EXAMPLE 2

A transfer film was produced in the same manner as in Example 1 except that the composition for a conductive layer was applied in an amount of 12 mg/m². Thereafter, a conductive film was obtained in the same manner as in Example 1 except that the produced transfer film was used.

EXAMPLE 3

The silver nanowire dispersion in EtOH obtained in Example 1 was mixed with a dilution solvent to a silver nanowire concentration of 0.1% by mass, whereby preparing a composition 2 for a conductive layer. The dilution solvent contained 30% by mass of cyclohexanone.

A transfer film was produced in the same manner as in Example 1 except that the composition 2 for a conductive layer was applied in an amount of 12 mg/m². Thereafter, a conductive layered body was obtained in the same manner as in Example 1 except that the produced transfer film was used.

EXAMPLE 4

A transfer film was produced in the same manner as in Example 1 except that the composition 2 for a conductive layer was applied in an amount of 15 mg/m². Thereafter, a conductive layered body was obtained in the same manner as in Example 1 except that the produced transfer film was used.

EXAMPLE 5

A transfer film was produced in the same manner as in Example 1 except that the composition 2 for a conductive layer was applied in an amount of 25 mg/m². Thereafter, a conductive layered body was obtained in the same manner as in Example 1 except that the produced transfer film was used.

EXAMPLE 6

A transfer film was produced in the same manner as in Example 1 except that the composition 2 for a conductive layer was applied in an amount of 50 mg/m². Thereafter, a conductive layered body was obtained in the same manner as in Example 1 except that the produced transfer film was used.

EXAMPLE 7

A transfer film produced in the same manner as in Example 3 and the release film was removed. The transfer film was further irradiated with ultraviolet light (600 mJ) to produce a conductive layered body.

EXAMPLE 8

A transfer film was produced in the same manner as in Example 3. A composition for a coating resin layer with the formulation described below was applied to the conductive layer to a dried thickness of 100 nm. The applied composition was dried at 70° C. for one minute and then irradiated with ultraviolet light (10 mJ) to form a coating resin layer, thus producing a transfer film. Thereafter, a conductive layered body was obtained in the same manner as in Example 1 except that the produced transfer film was used.
(Composition for Coating Resin Layer)
KAYARAD PET-30 (pentaerythritol triacrylate/pentaerythritol tetraacrylate mixture, Nippon Kayaku Co., Ltd.)
5% by mass
IRGACURE 184 (BASF) 0.25% by mass
MEK 70% by mass
Cyclohexanone 24.75% by mass

Comparative Example 1

A transfer film was produced in the same manner as in Example 1 and used as a conductive layered body without any further treatment.

Comparative Example 2

A transfer film was produced in the same manner as in Example 1. A composition for a coating resin layer having the same formulation as in Example 8 was applied to the conductive layer of the transfer film to a dried thickness of 30 nm. The applied composition was dried at 70° C. for one minute and then irradiated with ultraviolet light (600 mJ) to form a coating resin layer, whereby producing a conductive layered body.

Comparative Example 3

A conductive layered body was obtained in the same manner as in Comparative Example 2 except that the composition for a coating resin layer was applied to a dried thickness of 100 nm.

Comparative Example 4

A conductive layered body was obtained in the same manner as in Comparative Example 2 except that the composition for a coating resin layer was applied to a dried thickness of 5 μm.

Comparative Example 5

A transfer film was produced in the same manner as in Example 1 except that the composition 1 for a conductive layer was applied in an amount of 75 mg/m². Thereafter, a conductive layered body was obtained in the same manner as in Example 1 except that the produced transfer film was used.

The conductive layered bodies obtained in the examples and comparative examples were subjected to the following evaluations. Table 1 shows the results.
(Total Light Transmittance)
The total light transmittance of each conductive layered body was measured with a haze meter (HM150) produced by Murakami Color Research Laboratory Co., Ltd. by a method in accordance with JIS K7105.
(Haze Value)
The haze of each conductive layered body was measured with a haze meter (HM150) produced by Murakami Color Research Laboratory Co., Ltd. by a method in accordance with JIS K7105.
(Value of Haze Derived from Conductive Fibrous Filler)
As shown in Table 1, a substrate according to Experiment Example 1 was prepared in the same manner as the conductive layer according to the examples, except that the substrate contained no conductive fibrous filler. A sample 0 was prepared by bonding glass to both sides of the substrate using optically clear adhesive tape (OCA). The haze of the sample 0 was measured and taken as H0. Samples 1 were prepared by bonding glass to both sides of each of the conductive layers according to the examples and the comparative examples. The haze of each sample 1 was measured and taken as H1. The haze determined by calculating H1-H0 was taken as the value of the haze derived from the conductive fibrous filler.
(Sheet Resistance Value)
For each conductive layered body, the resistance value (sheet resistance) of the surface of the conductive layer on the side opposite the receiver was measured in accordance with JIS K7194:1994 (Testing method for resistivity of conductive plastics with a four-point probe array) using Loresta GP (Model MCP-T610) produced by Mitsubishi Chemical Corporation.
(Ratio of the Conductive Material Element)
For each conductive layered body, the ratio, in atomic percentage, of the conductive material element (Ag) on the surface of the conductive layer on the side opposite the receiver was measured under the following conditions by X-ray photoelectron spectroscopy. As mentioned below, the value measured at a depth of 10 nm from the surface was taken as the ratio of the conductive material element on the surface.
Accelerating voltage: 15 kV
Emission current: 10 mA
X-ray source: Al dual anode
Measurement area: 300×700 μmφ

Measurement at a depth of 10 nm from the surface
The average of three measurements (n=3, three random sites)
(Surface Hardness)
The surface hardness of the conductive layer of each conductive layered body was measured using an ultramicrohardness measuring device (PICODENTOR, Fischer) under the following conditions.
Maximum load: 40 mN
Load application: 20 s
Indentation depth from the surface: 1000 nm, 100 nm, 10 nm
The average of five measurements (n=5, five random sites) for each indentation depth
(Solvent Resistance)
For each conductive layered body, the solvent resistance of the surface of the conductive layer on the side opposite the receiver was evaluated with a Gakushin-type rubbing tester under the following conditions.
Waste cloth impregnated with IPA and waste cloth impregnated with PMA were each mounted on a jig (1 kg/4 cm$^2$). Each waste cloth was reciprocated five times on the surface of the conductive layer of the conductive layered body on the side opposite the receiver. Then the surface resistance value and the appearance were evaluated.
The five reciprocating movements were conducted at an evaluation length of 50 mm and a rubbing speed of 100 mm/sec. The appearance was evaluated by reflecting light from a fluorescent lamp off the surface to visually check the surface for scratches.

(Scratch Resistance)
For each conductive layered body, the scratch resistance of the surface of the conductive layer on the side opposite the receiver was evaluated using a Gakushin-type rubbing tester under the following conditions.
Waste cloth mounted on a jig (1 kg/4 cm$^2$) was reciprocated five times on the surface of the conductive layer of the conductive layered body on the side opposite the receiver. The sheet resistance and the appearance after the five reciprocating movements were evaluated.
The five reciprocating movements were conducted at an evaluation length of 50 mm and a rubbing speed of 100 mm/sec. The appearance was evaluated by reflecting light from a fluorescent lamp off the surface to visually check the surface for scratches.
(Etching Suitability)
An aqueous solution of phosphoric acid, nitric acid, and acetic acid (SEA-5, Kanto Chemical Co., Inc.) was warmed to 35° C., and the conductive film was immersed therein for two minutes. The resistance value of the surface of the conductive layer on the side opposite the receiver was then measured to determine the etching suitability under wet conditions.
(Bending Test)
Each of the conductive layered bodies obtained in the examples and comparative examples was wound around a metal bar (φ 4 mm) with the conductive layer surface facing outward. The sheet resistance value was then measured by the above method and the presence and absence of cracks was visually checked.

TABLE 1

| | Example 1 | Example 2 | Example 3 | Example 4 | Example 5 | Example 6 | Example 7 |
|---|---|---|---|---|---|---|---|
| Total light transmittance (%) | 90.5 | 90.2 | 90.2 | 89.5 | 88 | 82 | 90.2 |
| Haze (%) | 1.2 | 1.4 | 1.4 | 1.7 | 2 | 4.3 | 1.4 |
| Haze (%) derived from conductive fibrous filler | 0.8 | 0.9 | 0.9 | 1.2 | 1.4 | 3.5 | 0.9 |
| Sheet resistance (Ω/□) | 98 | 53 | 45 | 39 | 23 | 5 | 40 |
| Surface Ag ratio (at %) | 0.4 | 0.47 | 0.47 | 0.98 | 2.05 | 4.95 | 0.47 |
| Surface hardness (PICODENTOR) (N/mm$^2$) at 10 nm | 5620 | 5789 | 5620 | 5322 | 4992 | 4721 | 32165 |
| at 100 nm | 323 | 315 | 323 | 313 | 301 | 282 | 953 |
| at 1000 nm | 43 | 45 | 43 | 40 | 38 | 35 | 93 |
| Solvent resistance (IPA) (Ω/□) | 99 | 53 | 45 | 40 | 27 | 5 | 40 |
| Solevent resistance (IPA) (appearance) | No change | No change | No change | No change | No change | No change | No change |
| Solvent resistance (PMA) (Ω/□) | 98 | 54 | 46 | 39 | 26 | 6 | 40 |
| Solvent resistance (PMA) (appearance) | No change | No change | No change | No change | No change | No change | No change |
| Scratch resistance (Ω/□) | 102 | 56 | 47 | 41 | 26 | 8 | 40 |
| Scratch resistance (appearance) | No change | No change | No change | No change | No change | No change | No change |
| Etching suitability (Ω/□) | over Load | over Load | over Load | over Load | over Load | over Load | over Load |
| Bending test (Ω/□) | 99 | 54 | 44 | 40 | 26 | 5 | 40 |
| Bending test (cracks) | None | None | None | None | None | None | None |

| | Example 8 | Comparative Example 1 | Comparative Example 2 | Comparative Example 3 | Comparative Example 4 | Comparative Example 5 | Experiment Example 1 |
|---|---|---|---|---|---|---|---|
| Total light transmittance (%) | 90.2 | 90.5 | 90.5 | 90.5 | 90.5 | 78 | 92 |
| Haze (%) | 1.4 | 1.3 | 1.2 | 1.2 | 1.3 | 5.8 | 0.2 |
| Haze (%) derived from conductive fibrous filler | 0.9 | 0.8 | 0.8 | 0.8 | 0.9 | 4.8 | 0 |
| Sheet resistance (Ω/□) | 46 | 95 | 108 | 113 | over Load | 3 | over Load |
| Surface Ag ratio (at %) | 0.46 | 0.68 | 0.25 | 0.14 | 0 | 6.21 | 0 |
| Surface hardness (PICODENTOR) (N/mm$^2$) at 10 nm | 5638 | 968 | 972 | 1019 | 56210 | 4532 | 5772 |
| at 100 nm | 322 | 124 | 135 | 181 | 3152 | 251 | 330 |
| at 1000 nm | 41 | 16 | 18 | 27 | 150 | 33 | 44 |
| Solvent resistance (IPA) (Ω/□) | 46 | over Load | over Load | 113 | over Load | 5 | over Load |
| Solevent resistance (IPA) (appearance) | No change | Many scratches | Many scratches | No change | No change | No change | No change |
| Solvent resistance (PMA) (Ω/□) | 46 | over Load | over Load | 125 | over Load | 5 | over Load |
| Solvent resistance (PMA) (appearance) | No change | Many scratches | Many scratches | No change | No change | No change | No change |
| Scratch resistance (Ω/□) | 46 | over Load | over Load | 387 | over Load | 5 | over Load |
| Scratch resistance (appearance) | No change | Many scratches | Many scratches | 3 scratches | No change | 3 scratches | No change |
| Etching suitability (Ω/□) | over Load | over Load | over Load | 678 | over Load | over Load | over Load |
| Bending test (Ω/□) | 45 | 96 | 97 | 114 | over Load | 3 | over Load |
| Bending test (cracks) | None | None | None | None | Presence | None | None |

In Table 1, "over Load" means that the resistance value was greater than measurable range and thus was not measurable.

As shown in Table 1, the conductive layered bodies according to the examples were excellent in all of the total light transmittance, haze, surface hardness, solvent resistance, scratch resistance, and etching suitability. The conductive layered bodies according to Examples 3 to 6 and 8, in which the conductive layers did not contain the binder resin, had a lower resistance value than the conductive layered bodies according to Examples 1 and 2, in which the conductive layers contained the binder resin. Here, the resistance value of the conductive layered body according to Example 8 is the value on the surface of the coating resin layer. The conductive layered body according to Example 7 was excellent in surface hardness as compared with the conductive layered body according to Example 3 because of the additional ultraviolet irradiation after the removal of the release film of the transfer film.

The conductive layered body according to Comparative Example 1 was poor in surface hardness, solvent resistance, and scratch resistance because it was produced simply by applying the conductive layer to the release film. The conductive layered bodies according to Comparative Examples 2 and 3, in which the coating resin layer was formed on the conductive layer, the ratio of the conductive material element constituting the conductive fibrous filler on the surface of the conductive layer was small. The conductive layered body according to Comparative Example 2, which included a thin coating resin layer, was poor in surface hardness, solvent resistance, and scratch resistance. The conductive layered body according to Comparative Example 3, which included a thick coating resin layer, was poor in surface hardness and scratch resistance, as well as in etching suitability. The conductive film according to Comparative Example 4, which included a very thick coating resin layer, was poor in sheet resistance. The conductive film according to Comparative Example 5 was low in total light transmittance and haze value (and haze derived from the conductive fibrous filler) because of the application of a large amount of the composition for a conductive layer.

INDUSTRIAL APPLICABILITY

The conductive layered body of the present invention has excellent solvent resistance and scratch resistance, as well as a low haze value and a significantly high light transmittance. The conductive layered body can be suitable for use as a transparent electrode of, for example, displays such as liquid crystal displays (LCDs), plasma display panela (PDPs), touch panels, and solar batteries, especially as a transparent electrode of touch panels.

The invention claimed is:

1. A conductive layered body comprising, as an outermost layer thereof, a conductive layer containing a conductive fibrous filler,
   wherein the conductive layered body has a Martens hardness of 150 to 3,000 N/mm$^2$ as measured at an indentation depth of 100 nm from a surface,
   a ratio, in atomic percentage, of a conductive material element constituting the conductive fibrous filler on an outermost surface-side surface of the conductive layer is 0.15 to 5.00 at %,
   the conductive layer comprises the conductive fibrous filler and cured product of a binder resin containing a photopolymerization initiator,
   the conductive layer has the conductive fibrous filler contained in the binder resin, and
   part of the conductive fibrous filler protrudes from the outermost surface-side surface of the conductive layer.

2. The conductive layered body according to claim 1, wherein the conductive layered body has a total light transmittance of 80% or higher and a haze of 5% or lower.

3. The conductive layered body according to claim 1, wherein the conductive fibrous filler has a fiber size of 200 nm or smaller and a fiber length of 1 μm or greater.

4. The conductive layered body according to claim 1, wherein the conductive fibrous filler is at least one selected from the group consisting of conductive carbon fibers, metal fibers, and metal-coated synthetic fibers.

5. The conductive layered body according to claim 1, wherein the conductive layer is on a resin layer.

6. A touch panel comprising the conductive layered body according to claim 1.

7. The conductive layered body of claim 1, wherein the Martens hardness is 200 to 1,000 N/mm$^2$.

8. The conductive layered body of claim 1, wherein the binder resin layer has a thickness of 200 nm or less.

9. The conductive layered body of claim 1, wherein the binder resin layer defines a surface for the conductive layer and the conductive fibrous filler protrudes from the surface of the conductive layer by 5 to 600 nm.

10. The conductive layered body according to claim 1, wherein the conductive layer consists of the conductive fibrous filler, the binder resin, the photopolymerization initiator, and optionally one or more selected from the group consisting of a dispersant, a surfactant, a discoloration inhibitor, a colorant, a defoamer, a leveling agent, a flame retardant, an ultraviolet absorber, a tackifier, a polymerization inhibitor, an antioxidant, and a surface modifier.

* * * * *